UNITED STATES PATENT OFFICE.

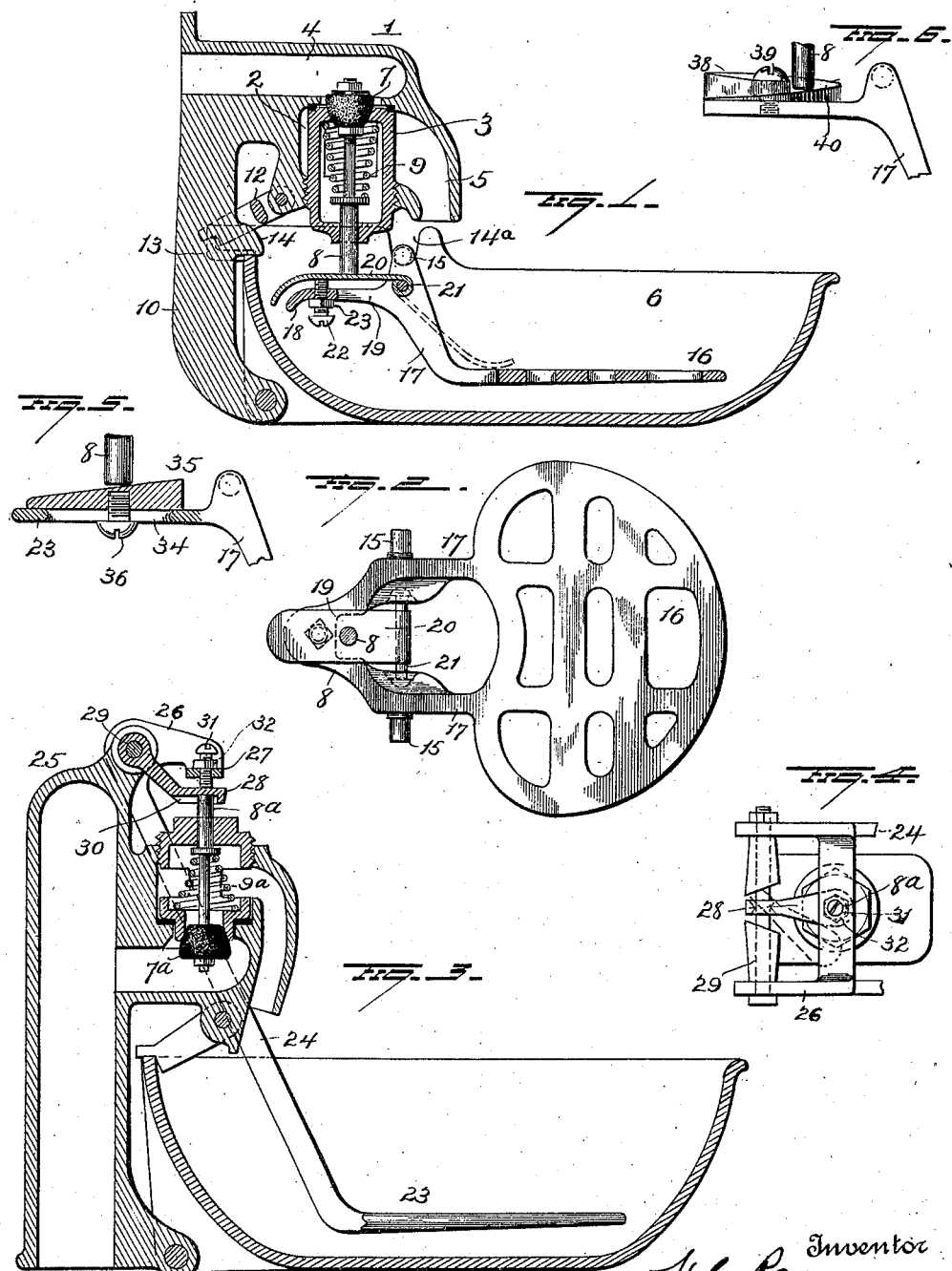

HUGO C. RASSMANN, OF BEAVER DAM, WISCONSIN, ASSIGNOR TO F. RASSMANN MANUFACTURING COMPANY, OF BEAVER DAM, WISCONSIN.

WATERING DEVICE FOR CATTLE.

1,402,653.   Specification of Letters Patent.   Patented Jan. 3, 1922.

Application filed May 8, 1919. Serial No. 295,670.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—one object of the invention being to provide simple and efficient means whereby the animal-operated platform lever by which the valve of the fount is opened, may be easily adjusted to insure the proper position of said platform lever within the bowl.

A further object is to provide adjusting means for insuring the proper position of a valve-controlling animal-operated lever within the bowl of a watering device and to so construct such means that the lever may be thrown out of operative relation to the valve stem of the valved fount which supplies water to the bowl.

With these and other objects in view, the invention consists in certain novel features of construction and combinations of parts as hereinafter set forth and pointed out in the claims.

In the accompanying drawings, Figure 1 is a sectional view of a watering device showing an embodiment of my invention; Figure 2 is a plan view showing the animal-operated platform lever; Figure 3 is a sectional view illustrating a modification; Figure 4 is a plan view of a portion of the structure shown in Figure 3, and Figures 5 and 6 are views showing other modifications.

1 represents a fount having a chamber 2 therein for the accommodation of a valve cage 3,—said fount being also provided with a duct or supply passage 4 adapted at one end for the reception of a suitable water supply pipe, (not shown) and is adapted at its other end to communicate with the valve cage 3,—and said fount is also formed with a spout 5 communicating with the valve cage. The spout 5 is so located as to discharge into a drinking bowl 6.

The upper portion of the valve cage is provided with a seat for a valve 7,—the stem 8 of the latter projecting through and downwardly beyond the lower end of the valve cage and said valve being retained normally on its seat by the action of a spring 9.

The fount 1 is provided with a depending arm or bracket 10, to the lower portion of which an extension 11 on the bowl 6 is pivoted. The bowl is retained normally in a horizontal position by means of a latch 12 pivoted to the fount and engaging a projection 13 on the bowl. A shoulder 14 projects from the arm 10 and is straddled by the latch, said shoulder constituting an abutment for the rear portion of the bowl.

The diametrically opposite walls of the bowl are made with sockets or recesses, such as shown at 14$^a$ to form bearings for the trunnions 15 of a platform lever 16 disposed in the bowl above the bottom thereof so as to be operable by an animal in the act of drinking to open the valve of the fount as hereinafter explained. The platform lever is made with upwardly extending members 17 from which the trunnions 15 project and from said members, an arm 18 projects rearwardly below the lower end of the valve stem 8 and is made with an opening 19.

In the construction of water devices in which the opening of the valve of the fount is controlled by an animal-operated lever sustained by the valve stem, it has been difficult to insure the proper normal position of said lever in the bowl. This is due, in part, to the difficulty in making valve stems for a plurality of the watering devices all of the same length, and furthermore, if there be variations in the valve seat or the valve itself (which latter is usually made of rubber), such variations would throw the lever out of proper position within the bowl. Again, when the device has been in use for a considerable length of time, there will be a tendency of the rubber valve to soften and in such case, the spring would move the stem further downwardly and result in raising the platform lever above the position which it should occupy. To overcome these objections and also to provide means whereby the opening of the valve by the platform lever may be prevented, when it is desired to prevent a sick or overheated animal from drinking, the devices now to be explained are provided.

In the embodiment of my invention shown in Figures 1 and 2, a plate or member 20 is pivotally supported at one end between the members 17 of the platform lever by means of a pin 21 and this pivoted plate or member 20 is disposed under the lower end of the valve stem 8 and supported in a normal position by an adjusting screw 22 threaded through the arm 18 of the lever and held in adjusted position by a jam nut 23. It is apparent that by adjusting the screw 22 against the plate or member 20 the platform of the lever will be moved and caused to be disposed in proper position in the bowl and that any variation in the valve stem or variations due to wear which might cause the platform of the lever to become improperly disposed can be compensated for.

By dropping the bowl on its pivotal connection with the arm 10, the plate or member 20 can be swung back to the dotted line position shown in Figure 1 and when the bowl shall have been again restored to a horizontal position, the means which normally support the platform of the lever in horizontal position will have been removed and the free end of the lever will engage the bottom of the bowl. It is apparent that the platform lever cannot now be operated to open the valve of the fount and an animal will be prevented from obtaining water from the bowl.

In Figure 3 of the drawing, I have shown the adaptation of my invention to the type of watering device in which a platform lever 23 is bifurcated in a manner to form two upwardly projecting members 24 pivotally connected at their upper ends to a lug on a standpipe 25,—said lever being provided with arms 26 projecting forwardly from the pivotal mounting of the lever members 24 and connected by a cross bar 27 disposed over the valve stem 8ª, which in this instance projects upwardly from the fount. The valve 7ª is pressed upwardly against its seat by the action of a spring 9ª. A plate or member 28 is pivotally mounted on the pin 29 on which the platform lever has its pivotal support, the connection of the member 28 with the pin 29 being such that said member shall be capable also of being moved sidewise. The member 28 is normally disposed over the valve stem 8ª and may be recessed, as at 30, to receive said valve stem, the end portion of the pivoted member 28 being thus disposed between the valve stem 8ª and the cross bar 27 of the animal operated lever. An adjusting screw 31 passes through said cross bar and engages the pivoted member 28, said screw being held in adjusted position by a jam nut 32. It is apparent that by adjusting the screw 31, the platform lever may be adjusted, through the member 28 and its bearing against the valve stem, and also that said member may be moved sidewise out of line with the valve stem when it is desired to render the valve of the fount inoperable by the platform lever.

In the form of the invention shown in Figure 5, the portions 17 of the platform lever 16 are made with an arm 33 having an elongated slot 34, disposed under the valve stem 8. The adjusting member in this instance consists of a wedge block 35,—viz. a block having an inclined upper face adapted to engage the valve stem. This block is adjustably secured to the arm 33 by means of a screw 36 screwed into said block and passing through the slot 34 with its head engaging the under face of the arm 33. By moving the block 35 on the arm 33, adjustment of the platform lever relatively to the valve stem and the bowl may be effected, and by moving said block far enough to bring the slot 34 in line with the valve stem, the operation of the latter by the platform lever will be prevented.

In the construction shown in Figure 6 the portions 17 of the platform lever 16 are provided with an arm 37 and the adjustable member consists of a block or disk 38 connected with said arm by a central screw 39, said block or disk having a spiral cam face 40 to engage the valve stem 8. By loosening the screw 39, the block or disk may be turned to effect the desired adjustment.

Other changes in details of construction of my invention might be made without departing from the spirit thereof or limiting its scope and hence I do not wish to restrict myself to the precise details herein set forth.

Having fully described my invention what I claim as new and desire to secure by Letters-Patent, is:—

1. In a watering device, the combination with a valved fount, a bowl, and an animal operated lever disposed in the bowl and provided with an arm, of a member carried by the lever and normally disposed between the arm of the latter and the stem of the valve of the valved fount and freely engaging said stem, and means movably supporting said member, whereby it may be moved from its normal position between the lever arm and valve stem to render the lever inoperable to open the valve.

2. In a watering device, the combination with a valved fount, a bowl and an animal-controlled lever therein, of a member movably attached to and carried by said lever, said member disposed normally to engage the valve stem of the valved fount and being movable on its connection with the lever to alter its relation to the valve stem, whereby the position of the lever above and relatively to the bottom of the bowl may be adjusted.

3. In a watering device, the combination with a valved fount, a bowl and an animal operated lever, of a member interposed between the valve stem of said valved fount and said lever and movable into and out of operative connection between these parts, and means whereby said member may be adjusted to adjust the lever.

4. In a watering device, the combination with a valved fount, a bowl, and an animal operated lever entering the bowl, of an adjusting device carried by said lever and normally engaging the valve stem of the valved fount, said adjusting device being operable to adjust the position of the animal operated lever above and relatively to the bottom of the bowl.

5. In a watering device, the combination with a valved fount, a bowl, and an animal-operated lever entering the bowl, of a member carried by said lever and disposed between the valve stem of said valved fount and said lever and engaging the valve stem, said member being shiftable out of cooperative relation to said valve stem, the connection of said member with the lever being adjustable to adjust the position of said lever.

6. In a watering device, the combination with a valved fount, a bowl, and an animal operated lever supported in normal position by the valve stem of said valved fount, of an adjustable device carried by said lever and adapted to engage under said valve stem, whereby the position of the animal-operated lever may be adjusted in the bowl.

7. In a watering device, the combination with a valved fount, a bowl, and an animal-operated lever, said lever having an arm, of an adjustable device supported by the lever and disposed between said arm thereof and the valve stem of the valved fount whereby the position of said lever in the bowl may be adjusted.

8. In a watering device, the combination with a valved fount, a bowl and an animal-operated lever having an arm in line with the axis of the valve stem of said valved fount, of a member pivotally supported by the lever and disposed between said lever and the valve stem of the valved fount, and a screw engaging said member and said arm.

9. In a watering device, the combination with a valved fount, a bowl, and an animal-operated lever having an arm, of a pivoted member supported by said lever and normally disposed between the valve stem of said valved fount and the lever arm, and shiftable away from said valve stem, and adjustable means engaging said pivoted member and the lever arm.

10. In a watering device, the combination with a valved fount, a bowl, and an animal-operated lever having an arm, of a pivoted member supported by said lever and normally disposed between the valve stem of the valved fount and the lever arm, and a screw carried by said lever arm and engaging said pivoted member, whereby the position of the animal-operated lever may be adjusted in the bowl.

11. In a watering device, the combination with a valved fount, a bowl, and an animal-operated lever having an arm, of a pivoted member supported by said lever and normally disposed over said arm thereof and under the valve stem of the valved fount, said member being shiftable from its position over the lever arm and under the valve stem to a position away from both, and adjusting means engaging said member and said arm to adjust the position of the animal-operated lever in the bowl.

12. In a watering device, the combination with a valved fount, a bowl, and an animal-controlled lever supported in position within the bowl by the valve stem of the valved fount, of an adjusting means between the stem of said valve and said lever for adjusting the position of the latter above and in relation to the bottom of the bowl.

13. In a watering device, the combination with a valved fount, a bowl and an animal-controlled lever having a member disposed in line with the stem of the valve of the valved fount, of adjusting means interposed between said member of the lever and said valve stem for adjusting the position of the lever.

14. In a watering device, the combination with a valved fount, a bowl, and an animal-controlled lever having a valve-operating part, of a member adjustably disposed between said valve-operating part of the lever and the stem of the valve of the valved fount and engaging both for adjusting the same above and in relation to the bottom of the bowl, said member being also shiftable to disconnect the valve operating part of the lever from operative relation with the valve stem.

15. In a watering device, the combination with a fount, a bowl, and an animal-controlled lever, of a pivoted member normally disposed between the valve stem of the valved fount and said lever, and means adjustably connected with the lever and engaging said member to adjust the position of the lever.

16. In a watering device, the combination with a valved fount, a bowl, and an animal-controlled lever entering the bowl and having an arm, of a member between said arm and the valve stem of the valved fount and normally engaging said valve stem, and means adjustably secured to said arm of the lever and engaging said member for adjusting the position of the lever.

In testimony whereof, I have signed this specification in the presence of two subscribing witnesses.

HUGO C. RASSMANN.

Witnesses:
H. R. VETTER,
A. B. CHANDLER.